[72] Inventor Frank C. Genovese
Yonkers, New York
[21] Appl. No. 648,769
[22] Filed June 26, 1967
[45] Patented Nov. 10, 1970
[73] Assignee International Business Machines Corporation
Armonk, New York
a corporation of New York

[54] HIGH RESOLUTION MULTIPLE IMAGE CAMERA

9 Claims, 16 Drawing Figs.

[52] U.S. Cl. 95/18, 355/46, 355/54
[51] Int. Cl. G03b 19/16, G03b 27/44
[50] Field of Search 95/18, 18P, 4.5, 12.21; 355/53, 86, 95, 46, 54

[56] References Cited
UNITED STATES PATENTS

| | | | |
|---|---|---|---|
| 2,158,039 | 5/1939 | Wenczler | 95/4.5 |
| 2,492,520 | 12/1949 | Bonnet | 95/18(P)UX |
| 2,950,644 | 8/1960 | Land | 95/18(P)UX |
| 3,353,469 | 11/1967 | Grover | 355/95 |

*Primary Examiner*—John M. Horan
*Attorneys*—Hanifin and Jancin and George O. Saile

ABSTRACT: A high resolution apparatus, for forming an image in a photosensitive medium from an object. Both optical and structural linkages are provided between the object and the medium. The optical and structural linkages are matched. A device scans the object to sequentially expose the photosensitive medium at high resolution. The linkages may be constructed to either magnify or minify the exposed object. The apparatus is a high resolution multiple image camera and is preferably used for fabricating microelectronic circuit masks. The master pattern is sequentially scanned and the photosensitive medium is sequentially exposed over the entire masked pattern to obtain the highest possible resolution in the images formed in the photosensitive medium.

PRIOR ART

INVENTOR
FRANK C. GENOVESE

BY George O. Saile
ATTORNEY

HIGH RESOLUTION MULTIPLE IMAGE CAMERA

BACKGROUND OF INVENTION

1. Field of Invention

The invention relates to photographic apparatus for magnification and minification of images, and more particularly to multiple image photographic apparatus and method for fabricating photolithographic masks necessary to the manufacture of semiconductor devices. The fabrication of semiconductor devices requires a plurality of photolithographic masks of a precise geometry. The masks are successively registered with a semiconductor substrate to establish patterns in the substrate which are to be the semiconductor devices.

2. Description of Prior Art

The step and repeat method has been widely used for making photolithographic masks. In this method, a master pattern or object of the desired design is placed in a microgauge device and the pattern is projected thereon only in a first selected area. The pattern is then stepped a specific distance, and is again projected onto the photographic plate. In this way, a row of latent images is formed in the plate. Additional rows form a rectangular matrix of images in the plate. The plate is developed and is then used as a photolithographic mask for each step of microelectronic fabrication and separately generated by a similar step and repeat operation. The step and repeat technique has been very effective. However, with the present effort toward even further microminiaturization, it has become difficult to establish images on one mask in the same relative positions as their related images on another mask of the series. The step and repeat method's requirement for conventional photographic materials limits the method to the problems, such as graininess, of these materials.

Multiple image photographic apparatus has been used to produce photolithographic masks in the prior art. One apparatus for fabricating masks is described in the W. E. Harding U.S. Pat. No. 3,288,045 issued Nov. 29, 1966 and assigned to the same assignee as the present invention. The masks produced by this apparatus permit the fabrication of approximately 1,100 discrete transistors in a semiconductor wafer of approximately one and one-quarter inches in diameter. A lenticulated lens divides the mask into 1,100 discrete cells. The lens permits a single pattern to be reproduced in each of the discrete cells. The further desire for microminiaturization produces a problem in resolution of the image projected on the photographic plate because a simple single surface lenticulated lens provides a relatively small area of good resolution about the optical axis of each unit cell. The resolution in the remainder of the cell is essentially unusable in producing a mask of the required definition. The good resolution area is satisfactory for several devices, but unsatisfactory for any more than these several. It is imperative therefore to expand the good or high resolution area of each individual cell to increase the complexity or number of the semiconductor devices in each cell.

An apparatus and method for improving the resolution over the above mentioned patent was filed as the U.S. Pat. application of W. E. Harding et al. Ser. No. 520,582 filed Jan. 14, 1966 and assigned to the same assignee as that of the present invention. In this patent application movable plate is held in a plurality of discrete positions, typically four, by stop members. A pattern for each position is recorded in the photograph successively. After each pattern is recorded, the pattern is moved to the next position and so forth until the complete photograph is formed. A problem with this multiple image camera is that resolution is lost at the edges of the photographs taken at each of the discrete positions even though overlapping of the positions is used.

SUMMARY OF INVENTION

It is an object of the invention to provide a high resolution image-forming apparatus which can be adapted to minify or magnify the object being exposed.

It is another object of the invention to provide a high resolution multiple image camera apparatus for forming a photograph from a single object which is useful in the fabrication of microelectronic circuits.

It is a further object of this invention to provide a high resolution multiple image camera apparatus having a means for scanning an object which is located between the light source and the photographic plate in synchronism with the multiple image camera so as to form a multiple image photograph from a single object.

It is a still further object of this invention to provide an improved method for forming high resolution images which may be adapted to magnify or minify the object whose image is being formed.

In accordance with the broad aspects of the invention, a high resolution apparatus and method for forming an image in a photosensitive medium of an object includes a light source and a camera device which has a photosensitive medium therein. Matched optical and structural linkages are provided to link the object with the photosensitive medium. Means are provided to sequentially scan, by movement of the structural linkage, the object and expose the photosensitive medium sequentially. By proper design of the optical and structural linkages magnification or minification of the object can be effected and the photosensitive medium exposed with an enlarged or reduced high resolution image.

In accordance with the more limited aspects of the invention, the high resolution multiple-image camera apparatus for forming an image from a single object includes a light source and a multiple-image camera having a photosensitive medium and optical device for providing an optical linkage between the object and the photosensitive medium. A fixed structural linkage between the object and the camera device is used. The object, which is located between the light source and the photographic plate, is scanned in synchronism with the movement of the multiple image camera. The advantage of the synchronized scanning is that there is no limitation on field coverage and superior resolution is obtained by consistently using an on-axis optical system. The aim is to move the photosensitive medium on which the image is focused at the same rate as the image so that the registration of the photographic plate and the image is locked and no smearing is recorded on the photographic plate. The range of scan is then limited only by the mechanical or electrical linkage and not by the optical properties of the optical system. The field coverage of the optical system is deliberately limited to prevent off-axis, out of focus conditions. This further improves contrast when a field stop is provided at the surface of the photographic plate to cut off all stray and scattered light. The only portion of the photographic plate revealed to the optical system is that part actually being exposed at the moment and that which is dead-center on axis where the focus and contrast are superior.

The foregoing and other objects, features and advantages of the invention will be apparent from the following more particular description of the preferred embodiments of the invention, as illustrated in the accompanying drawings.

DESCRIPTION OF PREFERRED EMBODIMENTS

Figure 1:
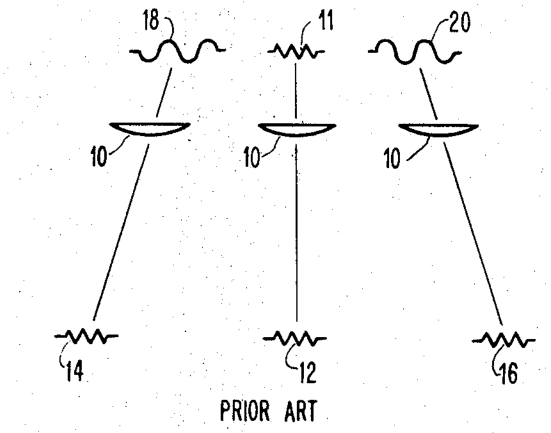
FIG. 1 is a schematic illustration of a focusing problem present in prior art multiple-image, simple lens element cameras.

FIG. 1 illustrates the problem of loss of resolution at the edges of the photosensitive medium depending upon the position of the lens 10 in relation to the object. The on-axis photograph 11 taken of the object 12 is seen to be a perfect reproduction while the objects 14 and 16 produce somewhat less resolution in their photographs 18 and 20.

Figures 2A, 2B, 2C:
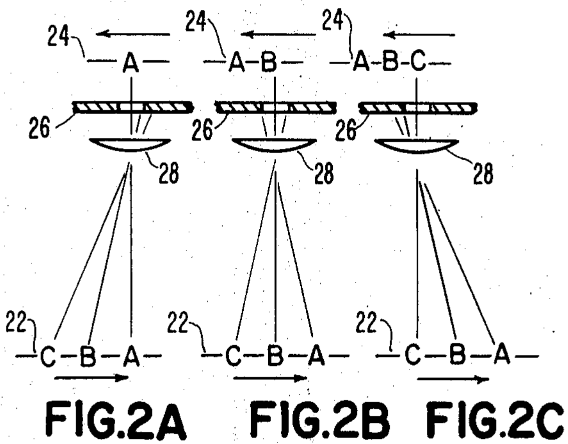
FIGS. 2A, 2B, and 2C are schematic illustrations of how the present apparatus for forming an image upon a photosensitive medium provides superior resolution to that of the prior art.

FIGS. 2A, 2B and 2C illustrate the basic scanning principle of the present invention. FIG. 2A illustrates the beginning of the scanning of the object 22 which includes the letters A, B and C. The photosensitive medium which is located at 24 sees only the letter A portion of the object 22 because of the light stop means 26. Lens 28 is between the object and the photographic plate. The scanning of the object 22 continues in FIG. 2B where the letter B of the object 22 is exposed to the photographic plate 24. In FIG. 2C the C portion of the object 22 is recorded on a photosensitive medium 24. In this manner, the photographic plate 24 has been fully exposed and all exposure was on-axis with respect to the lens 28. Therefore, the exposure of the photosensitive medium 24 was at the highest possible resolution. In effecting this exposure in the FIG. 2A, 2B and 2C embodiment, the photosensitive medium and the object were moved simultaneously and in opposite directions. Other combinations of movement of the basic elements of the apparatus are, of course, possible. The mechanism requires the proportional match of the optical and structural linkages between the object and the photosensitive medium to achieve the desired result. The structural linkage, which may be a reduction or magnification, provides field coverage and the optical linkage, magnification or reduction, provides resolution. A wide variety of systems based upon mechanical, electrical and hydraulic mechanisms can be used to achieve the structural linkage and the scanning movement. Some illustrative examples of possible scanning system mechanisms are levers, wedges, pantographs, geared X–Y tables, magnetic solenoids, electrical servos, heated wires, stepping motors, fringe counting, and pistons.

Figure 3:
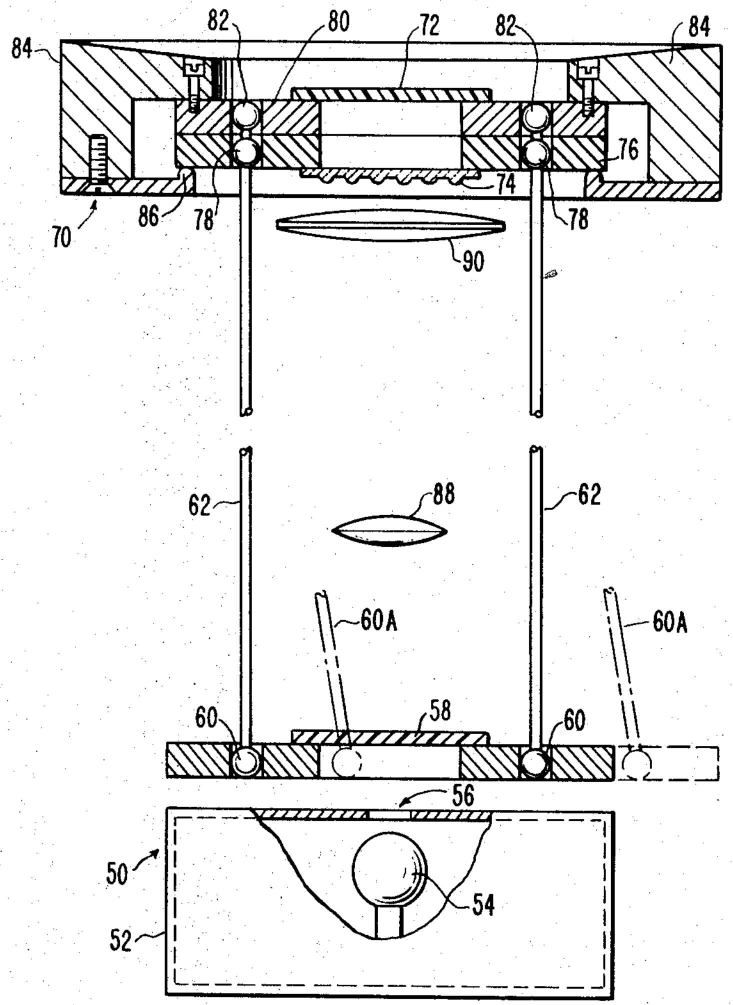
FIG. 3 is a first schematic, cross-sectional view of one mechanical embodiment of the present invention.

A first embodiment of the present invention is given in FIG. 3 wherein mechanical means are used for the scanning system. This embodiment utilizes optical and mechanical linkages which reduce the size of the object as seen by the photosensitive medium. FIG. 3 show a partially broken away and cross-sectional schematic view of the embodiment wherein a base assembly 50 includes a light box 52 containing a suitable light source 54 located just below a small diameter opening 56 in the light box 52. The restricted opening allows a small diameter beam of light to be emitted from the light box precisely on the axis of the optical system through the artwork or master pattern which is located on the surface 58 of the base assembly. Located on the upper portion of the base assembly 50 are ball joints 60 which form pivot points for the reduction arms 62 extending from the joints. The reduction arms 62 extend to the upper assembly 70 which contains the photosensitive medium 72 and a multiple image optical device 74 located between the master pattern and the photosensitive medium. The multiple image optical device 74 shown is a lens array. Lens array 74 is attached to the block 76. The block 76 contains ball joints, pivot points 78. A photosensitive medium 72 is supported upon block 80. Block 80 contains ball pivot points 82. A block 80 which holds the photosensitive medium 72 is fixedly attached by means (not shown) to the upper assembly portion 84. A bearing means 86 supports the block 76 to which is attached the lens system 74. The reduction arms 62 can thus be moved by any suitable means (not shown) to sequentially scan the master pattern and sequentially expose the photosensitive medium by movement of the support 58 of the master pattern and the lens assembly 74 while holding the photosensitive medium 72 fixed. The broken line 60A indicates the ultimate position of the rod after a scanning movement of the plate 58. The lenses 88 and 90 along with the lens array 74 are the optical linkage of the present embodiment. The lens 88 and 90 are light collimating and magnifying lenses. The optical reduction is designed to match the mechanical reduction to give the desired high resolution image formed on the photosensitive medium.

Figure 4:
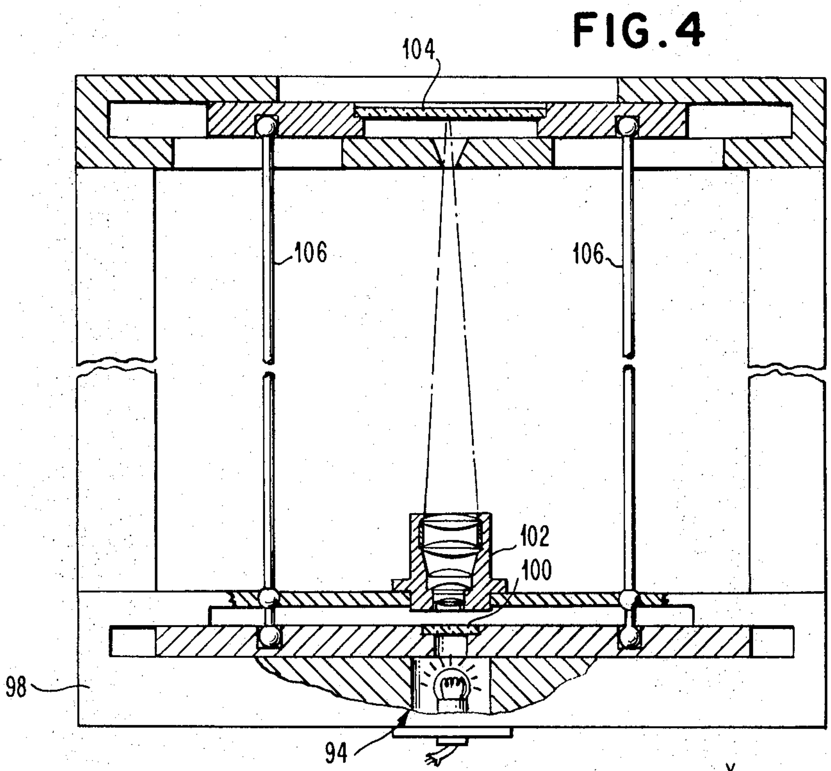
FIG. 4 is a second schematic, cross-sectional view of another mechanical embodiment of the present invention.

A second embodiment is illustrated in FIG. 4 wherein optical and mechanical linkages are used to magnify the size of the object as seen by the photosensitive medium. The principal difference in this embodiment over the FIG. 3 embodiment is the structure of the optical linkage and the mechanical linkage. A small diameter beam of light is emitted from the light box 94 precisely on the optical axis of the apparatus through the object or artwork 100. The light passes through the optical device which is the magnification lens system 102 which acts to enlarge the image optically as seen by the photosensitive medium 104. The optical linkage is matched by the mechanical linkage which includes the magnification arm 106 which is capable of moving, in this embodiment, the photosensitive medium 104 and the object 100 in a scanning sequence. The lens 102 and light box source 94 are held fixed in frame 98. The object is sequentially scanned and the photosensitive medium 104 sequentially exposed.

Figure 5:
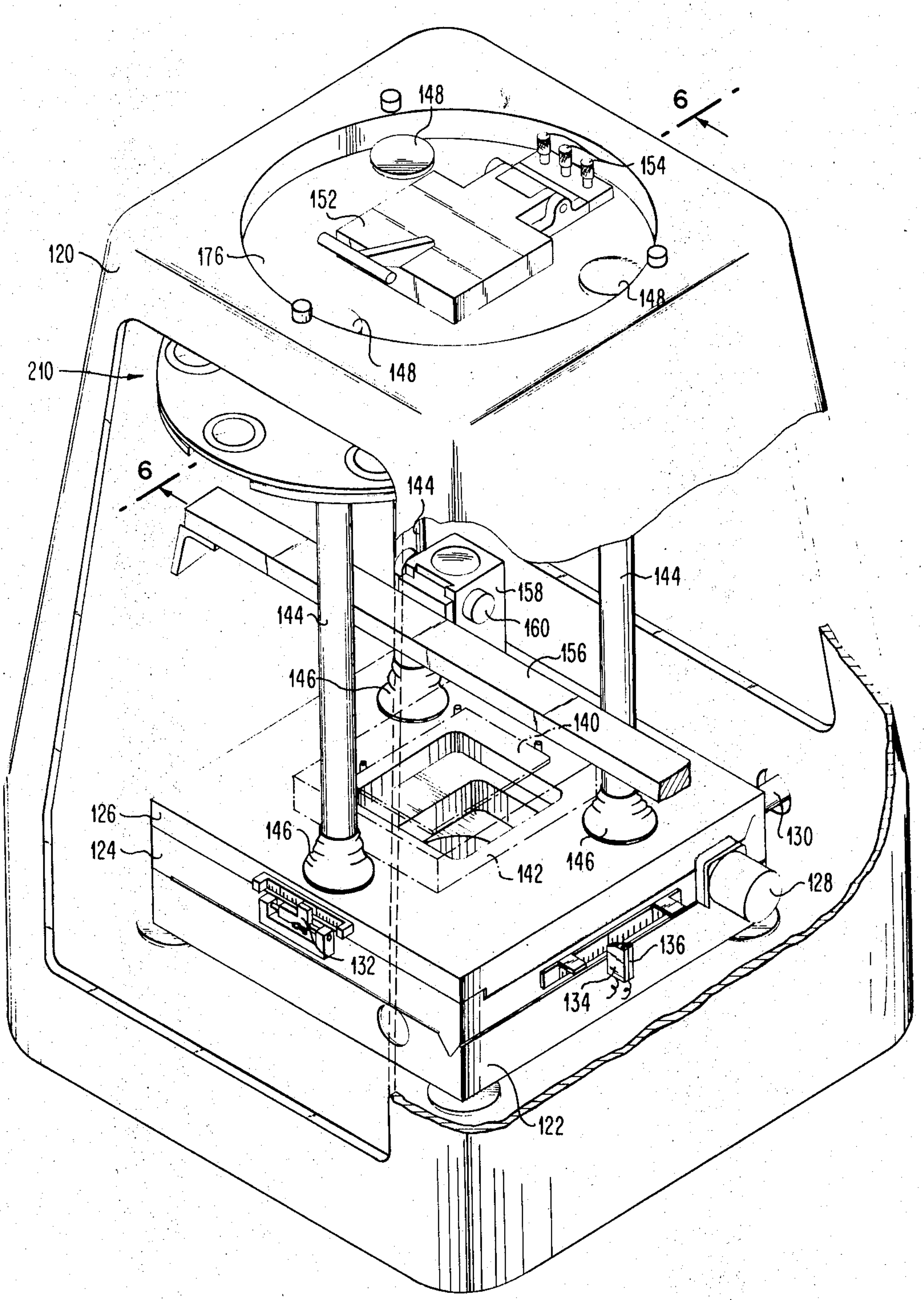
FIG. 5 is a prospective view of a preferred mechanical embodiment of the present invention.
Figure 6:
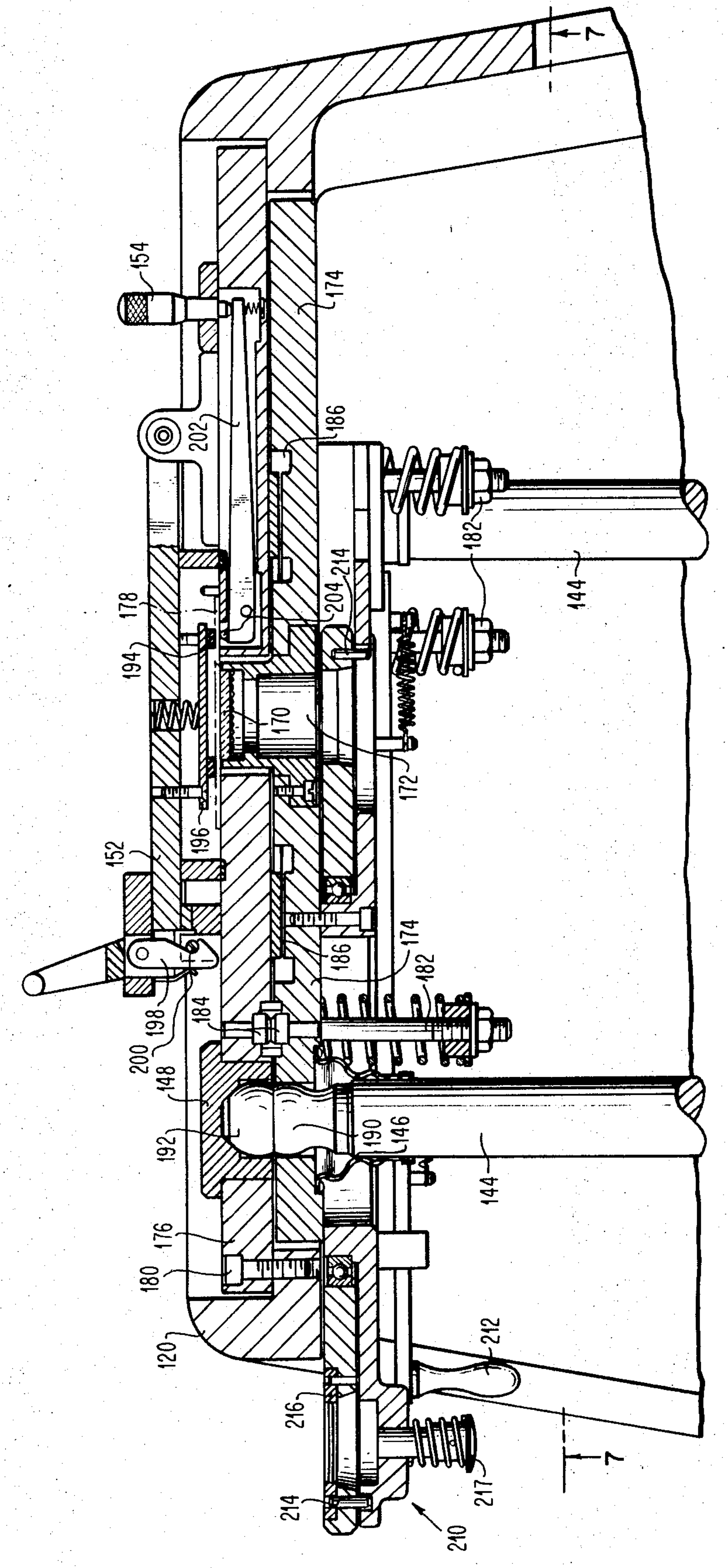
FIG. 6 is a cross-sectional view of the FIG. 5 embodiment illustrating the details of the preferred light source.
Figure 7:
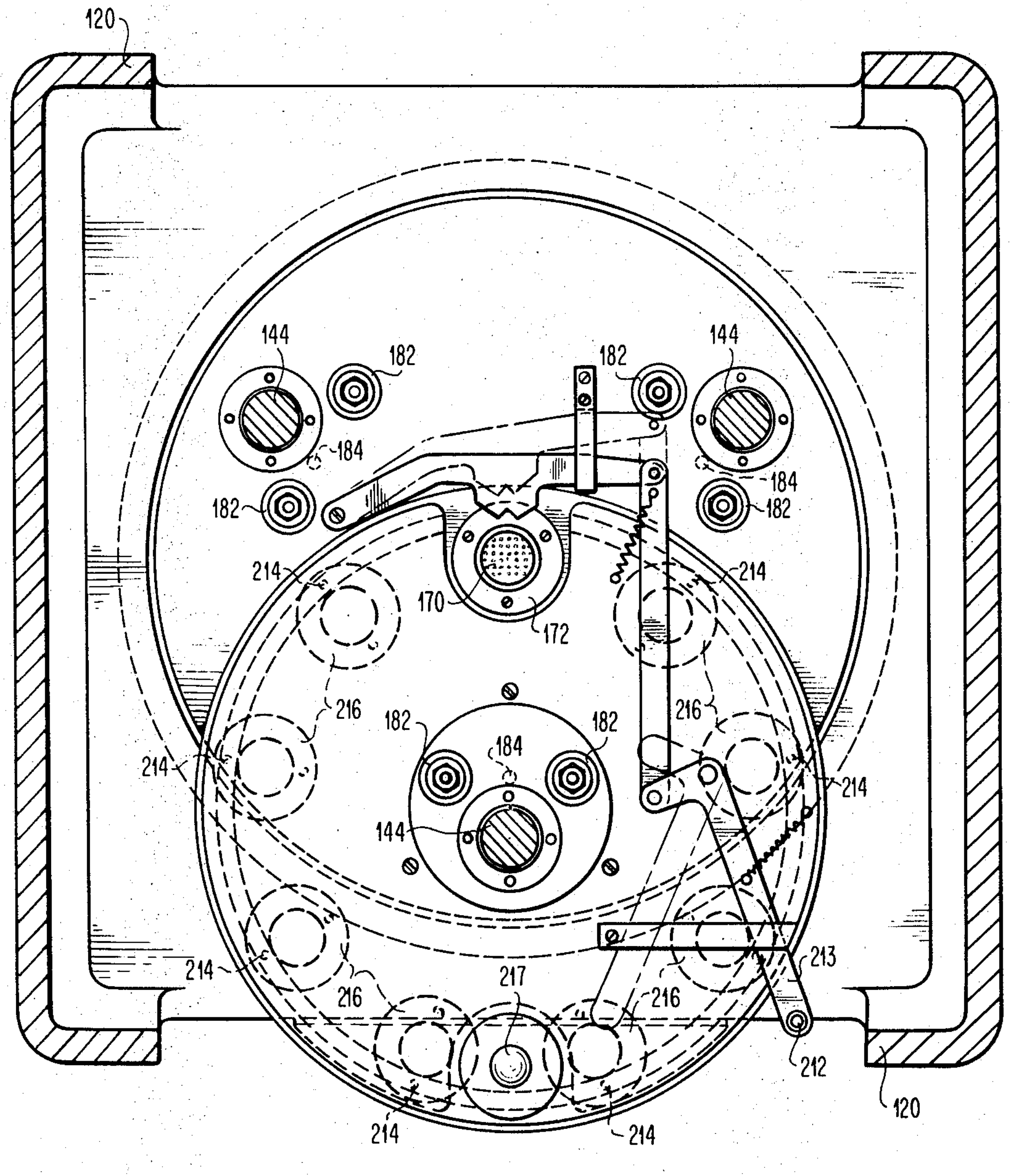
FIG. 7 is a cross-sectional view taken along line 7–7 of the FIG. 5 illustration.

FIGS. 5, 6, 7 and 8 illustrate in detail an embodiment which is similar to the principle of FIG. 3 embodiment. FIG. 5 is a perspective illustration of this detailed embodiment. This apparatus includes a main housing 120 which has supported therein a base number 122 which contains a light source (not shown). The base 122 additionally supports the X–Y table which includes a Y carriage 124 and an X carriage 126. The X carriage is driven by a stepping motor 128 and the Y carriage is driven by a scan drive motor which is connected to the shaft 130. Mounted on the X–Y table is a microswitch 132 which limits movement in the X direction. Mounted on the Y carriage are two photocell limit switches 134 and 136 for limiting the movement of the carriage in the scanning Y direction. An artwork or master pattern 140 is supported on an artwork alignment frame 142. The artwork alignment frame is supported upon the X carriage 126. Reduction arm 144 having a ball-shaped end fits in cylindrical holes in the X carriage 126. There may be two, three or more of these reduction arms. The mechanical reduction, which matches the optical reduction, is 50 to 1. Dust boot cover 146 covers the ball joint and protects it from dust and dirt. Thrust plates 148 for each reduction arm are seen in FIG. 5 which are fixedly attached to the upper plate 176. A removable dust cover 152 is used to conveniently insert the photosensitive medium into the camera apparatus. Focusing adjustment knobs 154 adjust the position of the photosensitive medium in relation to the lens array portion of the camera device. A mounting frame 156 supports the collimator-magnifier lens 158 having a fine magnification adjustment knob 160 which lens is a portion of the optical linkage which includes this lens and the multielement lens 170. FIG. 6 is a detailed cross-sectional view of the upper assembly of the present camera apparatus. The multiple element lens 170 is mounted on lens mount 172. The lens mount is fixed in the lower multiple plate 174 which supports the multiple element lens in a movable relationship. The upper plate 176 supports the photosensitive medium 178 in a fixed position. The upper plate is fixed to the upper portion of the main housing 120 by means of bolts 180. The lower plate 174 is supported by the upper plate by means of spring supports 182. Several, preferably three, suspension or bearing surfaces 184 are used to determine the plane between the upper and lower plates, and fix the geometry of the lower plate. Any bearing material may be used. However, tungsten carbide bearings have proven very satisfactory. Viscous oil gaps 186 in the lower plate 174 are used to reduce vibration in the equipment. The ball end structure of the reduction arm 124 is shown in detail in FIG. 6. The upper end of reduction arm 144 illustrated in FIG. 6 has two balled areas 190 and 192 which extend through cylindrical openings in the lower plate 174 and the upper plate 176. The upper ball portion 192 is forced against the thrust plate 148 which is fixed to the upper plate 176. The reduction arm 144 is forced upward into the thrust plate 148 by means of air pressure which is fed into a chamber below the ball joint (not shown) in the X carriage plate 126. A photosensitive medium 178 which can be for example a master plate with a photoresist composition coated thereon or a photographic plate is held in position by means of pressure pad 194 and in turn pressure plate 196 which is supported in dust cover 152. The dust cover is held fixed by hook 198 and pin 200. The focus adjustment 154 is made through reduction arm 202 which is approximately a 10 to 1 reduction to the master plate bearing support 204.

A rotary index 210 for stop plates is mounted on the main housing just under the lower plate 174. The stop plate can be understood through reference to FIGS. 6 and 7. The rotary index 210 is moved by means of indexing handle 212 which forces against the index pin 214 which is present in each stop plate 216. The FIG. 7 view does not have a stop plate over the multiple element lens 170 and therefore the multiple element lens 170 is in full view. The stop plate extractor 217 allows for the convenient removal of stop plates 216.

Figure 8:
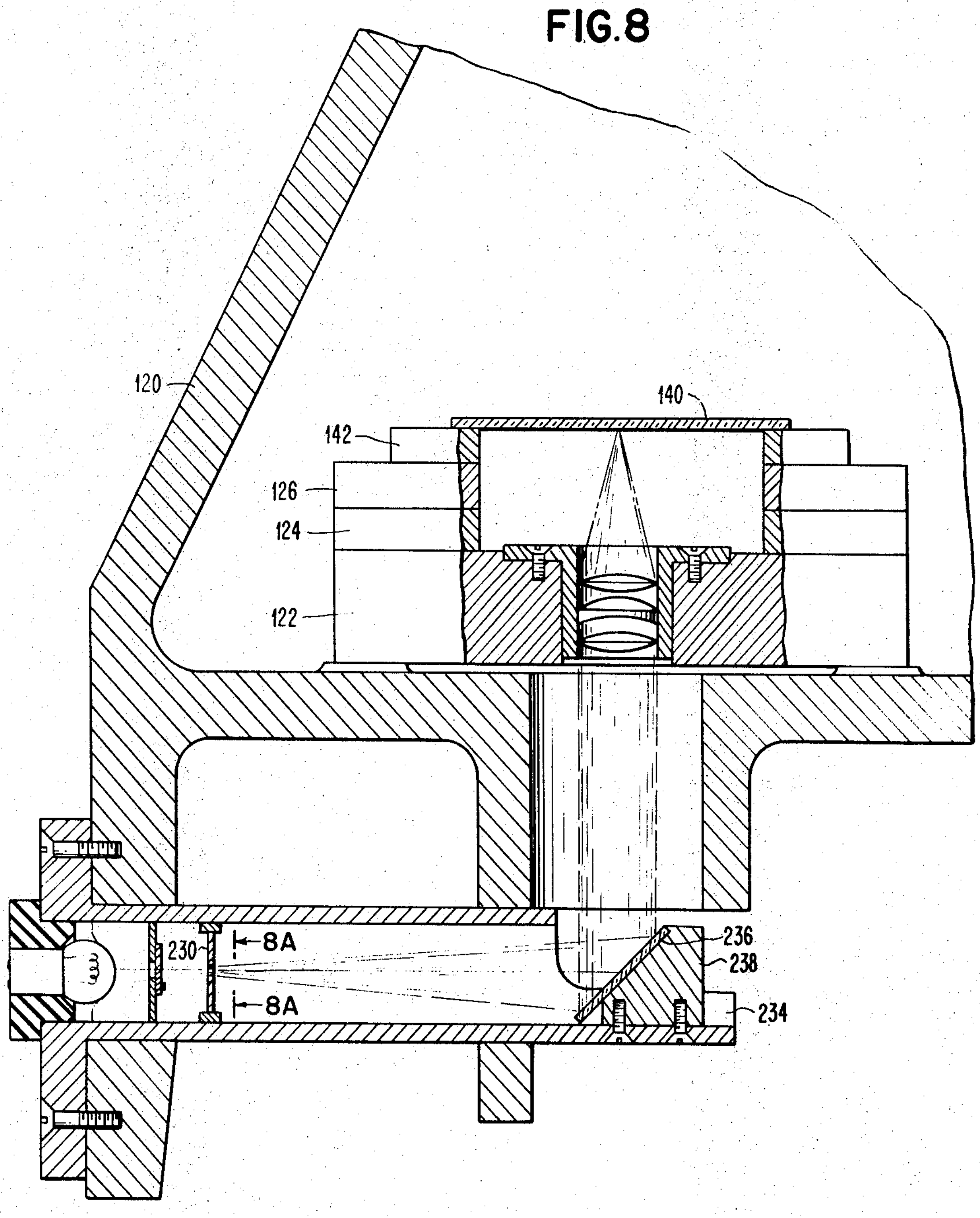
FIG. 8 is a cross-sectional view of the FIG. 7 apparatus taken along lines 8–8.
Figure 8A:
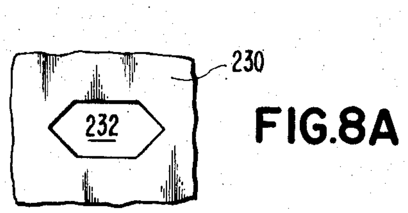
FIG. 8*a* is a detailed view showing the shape of the diaphragm used in the illuminating system.

FIG. 8 is a cross-sectional view of the X–Y table base showing in detail the light source for the present embodiment. Light comes through the diaphragm 230 having an opening shown in the exploded area 232. The opening 232 shapes the cross section of the beam of light to its shape. The light used is preferably substantially monochromatic and collimated. The light travels through the light tube 234 until it strikes the diagonal mirror 236 which is supported by an aluminum support 238. The narrow beam of light in the cross-sectional shape 232 is reflected off the mirror and through the condenser lens cell 240 which includes three lenses and is focused onto the artwork 140. The purpose of the mirror 236 is to allow the light input to come from the side of the apparatus rather than below it. There is a 3 to 1 reduction between the diaphragm 230 and the artwork 140.

Figure 9:
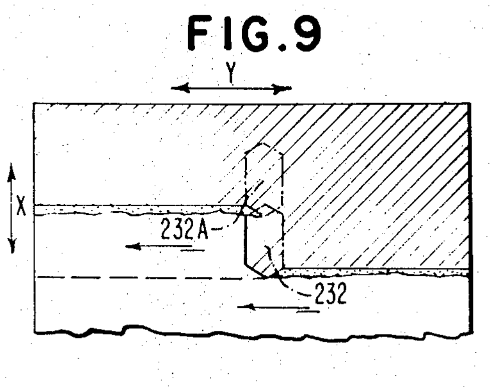
FIG. 9 is a view illustrating the exposure of the photosensitive medium.
Figure 10:
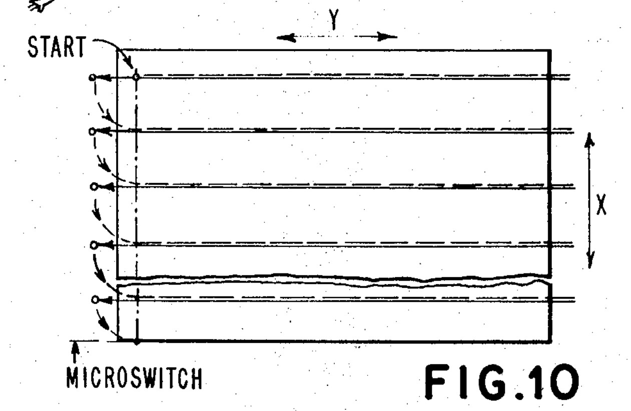
FIG. 10 is a diagram illustrating the preferred sweep of the scanning mechanism over the photosensitive medium.

The operation of the preferred embodiment illustrated in FIGS. 5, 6, 7 and 8 can be fully understood with reference to FIGS. 9 and 10. Scanning starts at the extreme X direction which is the top of the FIG. 9 illustration of the photosensitive medium being exposed. The cycle begins with the switching on of the light source. The scanner motor is started and the narrow beam of light 232 sweeps from the extreme right of the picture to the extreme left of the picture as shown in FIGS. 9 and 10. After completing the first scan which is approximately 150 mils wide on the artwork and overscanning a small amount, as shown in FIG. 10, to make sure that the picture has been completely included, the photocell 136 that has been previously set triggers a discriminator which turns off the scan motor and waits approximately half a second for the scan motor to come to a complete halt. After half a second a pulse is applied, shutting the light shutter 231 off which shuts off the exposing ultraviolet light. After another approximately half a second the scan motor is again turned on, this time reversing the travel in the Y direction, bringing the light beam on the left hand side of the FIGS. 9 and 10 into the picture again. In this reverse travel the light is off so that no exposure is made. During this time, the stepping motor 128 steps in the X direction approximately 150 mils. This is independent of the Y travel and can be adjusted in half mil increments. When the scan motor reverses to the extreme right limit in the Y direction a second photocell 134 senses its position, again triggering its discriminator which turns off the scan motor and allowing another half second for the motor to come to a halt. Then the discriminator opens the light shutter which allows ultraviolet light to pass through the system. Another half second goes by, at which time the scan motor again starts traveling in the Y direction, as in the first scan. In general, the picture is deliberately overscanned in order to allow all backlash to be taken up and motion smoothed before the actual photosensitive medium is exposed. At the end of the scan when the photosensitive medium has been completely exposed, which is approximately 20 rows for a 60 mil picture or 40 rows for a 120 mil picture, a limit switch 132 on the X–Y table stops the process, shuts the light off and backs the X–Y table into the original starting position where it is ready for the next exposure.

The scan width of 150 mils has been determined from the optical characteristics of the multielement lens. In general, this is determined, both experimentally and by calculation and corresponds to the area of 50 microinch line resolution. Some of the problems involved in the scanning are that the adjacent scans must mechanically match well enough so that a fine pattern is continuous from one scanned exposed strip to the next. This is done simply by deliberately designing the equipment to have this necessary mechanical excellence. Some of the other problems are that the exposure from the first scan is feathered into the exposure of the second scan and so on. By doing this, it is unnecessary to set it at exactly 150 mils. The nature of the aperture that limits the exposure is such that the feathering takes place over roughly two mils on the artwork or a very small figure on the actual finished plate. By doing it this way, a small waver from side to side has only the effect of changing the overall exposure by less than a few percent which is not really noticeable.

The cross-sectional shape 232 of the exposing narrow beam was chosen to provide the best possible feathering effect. The cross-sectional beam shape chosen comes to a point at its top and bottom so that complete exposure in the overlapping edges is made during two scans. The edges are feathered, as shown in FIG. 9, in the scans of beam 232A and 232 to give the required uniform exposure. The scan 232A underexposes the scanned region of its pointed lower portion. The scan 232 then underexposes its scanned region of its pointed upper portion in a complimentary manner to give the desired full exposure throughout.

In the FIGS. 5, 6, 7 and 8 preferred embodiment, the lens moves with respect to the photosensitive medium. Therefore, it is not possible to sandwich the lens tightly against the medium. This means that the lens must be rigid enough to support itself without serious flexure and that the photosensitive medium has to be on a very flat surface.

The photosensitive medium planarity is critical particularly when, as is preferred, a photoresist is the medium utilized. The photoresist has to be within a micron of absolute planarity for uniformity of results. It has been found necessary to select extremely flat glass, flat within one or two fringes, which is quite thick in order to be mechanically rigid. The rigidity is necessary because it is supported at three points on a three point suspension system.

The preferred photosensitive medium utilized in the FIGS. 5—8 embodiment is made using microflat glass, which is flat to a couple of fringes, as its substrate. The glass is carefully cleaned and coated with aluminum by vacuum evaporation. Other metals, of course, such as chromium could be used. The aluminum coating is then coated with a very thin coating of any suitable photoresist and dried. The prepared plate is then put in the apparatus for subsequent exposure. Following the exposure of the photoresist, the photoresist is developed. The aluminum is then etched with conventional techniques to yield a master in aluminum. The master can then be used to make a large number of copies by standard contact printing techniques.

The electronic circuit is not shown in detail because of its conventionality. The stepping is achieved by use of a standard stepping motor. The time delays are accomplished using simple RC networks. The photocells and discriminators are respectively photodiodes and Schmidt triggers.

The 3,650 Angstrom light source is used for several reasons which are that photoresist is preferably sensitive to 3,650 Angstrom; commercially available mercury light sources put out very strong and isolated lines at 3,650 and 3,663 which is actually a complex line but a very potent one, and the shorter wavelength allows higher resolution with the same F number lenses. A shorter wavelength than this was not chosen because it becomes difficult to find readily available materials which will pass through without causing a lot of scattering, absorption, fluorescence and other undesirable effects. Ordinary glass plates allow 3,650 to go through. It was decided that ordinary photographic glass plates should be used to support the master pattern or artwork for convenience and simplicity. The substrate for supporting the photosensitive medium is not as critical as the artwork substrate because the light does not go through the substrate holding the photosensitive medium before striking the medium.

Figure 13:
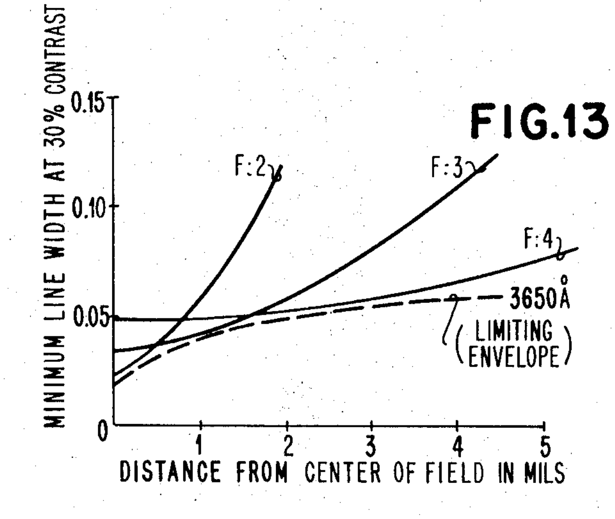
FIG. 13 is a graph showing the relationship between distance from the center of the field of the optical devices lens versus minimum line width.

The field of a single element lens which we are limited to in this case is greater for a larger F number lens although the alternate resolution at the center of the field is less. The present lens design is a compromise between a large field and the highest resolution. Calculations show the field to be about a 3 mil diameter circle for a 50 microinch line using 3,650 light and a single element lens as seen in FIG. 13. In general, the same holds true for other than a standard lens design, that is a Fresnel lens or a zone plate.

Figure 11:
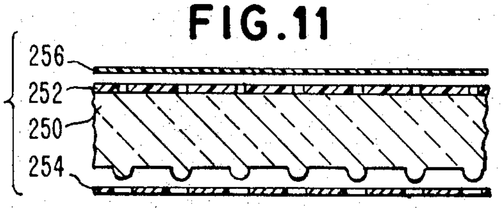
FIGS. 11 and 12 illustrate the details of various lens array modifications for the optical device.
Figure 12:
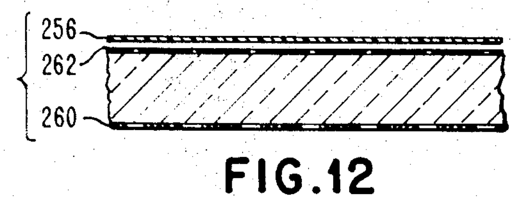

FIGS. 11 and 12 are modifications of the multielement lens structure shown in FIGS. 3 and 6. FIG. 11 shows a lenticulated lens 250, a field limiting stop 252 and an aperture stop 254. The photosensitive medium is given at 256. FIG. 12 uses a Fresnel phase plate or zone plate on glass 260 together with a field stop 262.

A Fresnel phase plate or zone plate has the advantages of ease of fabrication and relative stability of the system over lenticulated lens because of humidity and temperature effects. Fresnel zone plates or phase plates have the property of having not only real but virtual images at the same time. The virtual image amounts to a large amount of background light on top of and in the immediate vicinity of the real image. In the present camera apparatus, since only an on-axis picture is being taken, a virtual image which spreads itself in a very large circle is rather dim and can be eliminated by simply putting in a field stop, allowing only light of the real image on axis to reach the photosensitive material, photoresist in this case. Phase plates and zone plates have the further advantage that they have subsidiary foci at F/3, F/2 and so on, which have much higher resolution than the primary focus and could be used to increase the resolution of the system without doing any additional fabrication.

While the invention has been particularly shown and described with reference to a preferred embodiment thereof, it will be understood by those skilled in the art that various changes in form and details may be made therein without departing from the spirit and scope of the invention.

I claim:

1. A high resolution multiple image camera apparatus for forming a fixed image in a photosensitive medium of an object comprising:

A. a light source;

B. a multiple image camera including a means for holding said photosensitive medium and a Fresnel phase plate; and C. means for scanning the said object which is located between said light source and said photosensitive medium in synchronism with said multiple image camera to form said image.

2. A high resolution multiple image camera apparatus comprising:

a light source;

means for holding the master pattern over the said light source;

means for holding a photosensitive medium;

a multiple lens optical device positioned between said master pattern and said photosensitive medium to provide an optical linkage therebetween;

means providing a fixed mechanical linkage between said pattern and said photosensitive medium;

said optical and mechanical linkage being matched;

the light emitted from said light source being restricted to a small diameter beam on the axis of said optical linkage, and through said master pattern and said photosensitive medium; and means for exposing the photosensitive medium by scanning the master pattern in a systematic sequential manner.

3. A high resolution apparatus for forming an image in a photosensitive medium of an object comprising:

a light source;

means for shaping the cross section of the beam emitted from said light source into a narrow, shaped beam of light;

an X–Y table;

a frame for mounting a pattern of opaque and transparent areas;

said frame being mounted upon said X–Y table;

a camera device including means for holding said photosensitive medium and optical device for providing optical linkage between said pattern and said photosensitive medium;

at least two arms providing a mechanical linkage between said X–Y table and said camera device;

said optical and mechanical linkages being matched;

means for directing said shaped light beam through said object and onto said photosensitive medium;

means for moving said X–Y table in a continuous manner so as to move said light beam sequentially over said pattern and thereby sequentially expose said photosensitive medium.

4. The apparatus of claim 3 wherein said arms are reduction arms, said optical device includes a multiple image optical device, and said arms are mounted in the X–Y carriage and the support for said multiple image optical device for movement.

5. The apparatus of claim 4 further comprising a rotary index means for positioning stop plates adjacent said multiple image optical device and in the path of said shaped light beam.

6. A method for fabricating a microelectronic circuit mask comprising:

positioning a master pattern with relation to a narrow beam light emitting source, the pattern having opaque and transparent areas in a preselected geometric configuration;

positioning a photosensitive medium in the path of the said light beam from said light source through said pattern;

positioning a multiple image optical device between said master pattern and said photosensitive medium;

providing a structural linkage between said pattern and said photosensitive medium which linkage matches the optical linkage between the said pattern and said medium;

sequentially scanning with said light beam the said master pattern and sequentially exposing the said photosensitive medium over the entire master pattern to obtain the highest possible resolution in the images formed in the photosensitive medium; and developing the exposed photosensitive medium to form said mask.

7. The method of claim 6 wherein said structural and optical linkages produce more than about 50:1 reduction.

8. The method of claim 6 wherein the said light beam is substantially monochromatic and no more than about 3 mils of the center of the field of each of said multiple lens are utilized to project said pattern onto said photosensitive medium.

9. A high resolution apparatus for forming images of an object in a photosensitive medium comprising:

A. a multiple image camera including:

a. a lenticular lens means for projecting a segment of said object on corresponding segments of said medium disposed respectively, in the object and image planes of said lens means about the optical axes of individual lens elements thereof;

b. means for supporting said medium in the image plane of said lens; and c. means for supporting said object in the object plane of said lens;

B. means for sequentially bringing successive discrete segments of said object and corresponding successive discrete segments of said medium on the optical axes of said lens elements;

C. means for limiting the field coverage of said lens elements to the high resolution areas thereof along the said optical axes thereof; and D. means for exposing said object segments on their said corresponding medium segments positioned on said optical axes.